(12) United States Patent
Dodke

(10) Patent No.: US 9,398,042 B1
(45) Date of Patent: Jul. 19, 2016

(54) SYSTEMS AND METHODS FOR CAPTURING INPUT FROM USERS TO PREVENT DATA LOSS

(71) Applicant: Symantec Corporation, Mountain View, CA (US)

(72) Inventor: Dhananjay Dodke, Kharadi (IN)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 14/644,230

(22) Filed: Mar. 11, 2015

(51) Int. Cl.
*H04L 29/06* (2006.01)
*H04L 12/58* (2006.01)

(52) U.S. Cl.
CPC .......... *H04L 63/1433* (2013.01); *H04L 51/20* (2013.01)

(58) Field of Classification Search
CPC .................................................. H04L 63/1433
See application file for complete search history.

(56) References Cited

U.S. PATENT DOCUMENTS

| | | | | |
|---|---|---|---|---|
| 8,826,452 B1 * | 9/2014 | He | ................ | G06F 21/84 726/27 |
| 2010/0162347 A1 * | 6/2010 | Barile | ................ | G06F 21/552 726/1 |
| 2014/0165137 A1 * | 6/2014 | Balinsky | ................ | G06F 21/554 726/1 |

OTHER PUBLICATIONS

"Data loss prevention software", https://en.wikipedia.org/wiki/Data_loss_prevention_software, as accessed Jan. 19, 2015, Wikipedia, (May 9, 2010).

* cited by examiner

*Primary Examiner* — Andrew Nalven
*Assistant Examiner* — Khang Do
(74) *Attorney, Agent, or Firm* — ALG Intellectual Property, LLC

(57) ABSTRACT

The disclosed computer-implemented method for capturing input from users to prevent data loss may include (1) intercepting, as part of a data-loss-prevention application, user input intended for a data-processing application that would, if received by the data-processing application, cause the data-processing application to perform an operation on data that may violate a data-loss-prevention policy, (2) upon intercepting the user input, causing the data-processing application to perform an alternative operation on the data that makes the data accessible to the data-loss-prevention application, (3) scanning, while the data-processing application is prevented from performing the operation, the data for compliance with the data-loss-prevention policy, (4) determining, based on a result of the scanning, that the data complies with the data-loss-prevention policy, and (5) causing, in response to determining that the data complies with the data-loss-prevention policy, the data-processing application to perform the operation. Various other methods, systems, and computer-readable media are also disclosed.

20 Claims, 8 Drawing Sheets

SYSTEMS AND METHODS FOR CAPTURING INPUT FROM USERS TO PREVENT DATA LOSS

BACKGROUND

The ease with which digital information may be disseminated may create challenges for individuals and organizations concerned with preventing the loss of sensitive data. Individuals and organizations are therefore increasingly looking to data-loss-prevention (DLP) solutions to protect their sensitive data. Some DLP solutions may be directed to monitoring applications that disseminate content, such as email applications, to detect and prevent the dissemination of sensitive content by the monitored applications. Traditional DLP solutions may monitor such applications by loading, into the applications, add-ins that monitor the applications' activities. However, not all content-disseminating applications allow the use of add-ins. As a result, traditional DLP solutions may fail to prevent applications that do not allow the use of add-ins from disseminating sensitive content. The instant application, therefore, identifies the need for improved DLP solutions that do not require the use of add-ins.

SUMMARY

As will be described in greater detail below, the instant disclosure describes various systems and methods for capturing input from users to prevent data loss. In one example, a computer-implemented method for capturing input from users to prevent data loss may include (1) intercepting, as part of a DLP application, user input intended for a data-processing application that would, if received by the data-processing application, cause the data-processing application to perform an operation on data that may violate a DLP policy, (2) upon intercepting the user input, causing the data-processing application to perform an alternative operation on the data that makes the data accessible to the DLP application, (3) scanning, while the data-processing application is prevented from performing the operation, the data for compliance with the DLP policy, (4) determining, based on a result of the scanning, that the data complies with the DLP policy, and (5) causing, in response to determining that the data complies with the DLP policy, the data-processing application to perform the operation. In one embodiment, the DLP application may be separate and distinct from the data-processing application.

In some embodiments, the data may include an email, and the data-processing application may include an email application. In these embodiments, intercepting the user input intended for the data-processing application may include intercepting user input intended for the email application that would, if received by the email application, cause the email application to send the email to a location designated by a user of the email application. Additionally or alternatively, causing the data-processing application to perform the alternative operation may include causing the email application to save the email to a location accessible to the DLP application. Additionally or alternatively, scanning the data for compliance with the DLP policy may include scanning the email for compliance with the DLP policy. Additionally or alternatively, causing the data-processing application to perform the operation may include causing the email application to send the email to the location designated by the user.

In one example, causing the email application to save the email may include sending a command to the email application to save the email. In this example, causing the email application to send the email to the location designated by the user may include sending a command to the email application to send the email. In some examples, intercepting the user input may include intercepting the user input in response to determining that the email application does not support add-ins capable of performing capturing outgoing email data and/or add-ins capable of preventing send operations.

In some examples, intercepting the user input may include temporarily preventing the data-processing application from performing the operation that may violate the DLP policy. In some embodiments, causing the data-processing application to perform the alternative operation may include (1) generating an alternative input that would, if received by the data-processing application, cause the data-processing application to perform the alternative operation and (2) sending the alternative input to the data-processing application instead of the user input.

In some examples, intercepting the user input intended for the data-processing application may include intercepting, as part of the DLP application, a mouse event intended for the data-processing application that would, if received by the data-processing application, cause the data-processing application to perform the operation. Additionally or alternatively, intercepting the user input intended for the data-processing application may include intercepting, as part of the DLP application, a keyboard event intended for the data-processing application that would, if received by the data-processing application, cause the data-processing application to perform the operation.

In one embodiment, the computer-implemented method may further include (1) intercepting, as part of the DLP application, additional user input intended for the data-processing application that would, if received by the data-processing application, cause the data-processing application to perform the operation on additional data, (2) upon intercepting the additional user input, causing the data-processing application to perform the alternative operation on the additional data that makes the additional data accessible to the DLP application, (3) scanning, while the data-processing application is prevented from performing the operation, the additional data for compliance with the DLP policy, (4) determining, based on a result of the scanning, that the additional data does not comply with an element of the DLP policy, and (5) initiating a DLP action in response to determining that the additional data does not comply with the element of the DLP policy.

In one embodiment, the DLP action may include informing a user of the data-processing application that the additional data does not comply with the element of the DLP policy. Additionally or alternatively, the DLP action may include informing the user that the operation will not be performed on the additional data. Additionally or alternatively, the DLP action may include informing an administrator of the data-processing application that the user has attempted to perform the operation on data that does not comply with the element of the DLP policy. Additionally or alternatively, the DLP action may include permanently blocking the data-processing application from performing the operation on the additional data.

In one example, the DLP application may represent a printer application. Additionally or alternatively, the DLP application may represent a screen capturing application. Additionally or alternatively, the DLP application may represent a word processor application. In some examples, the operation may include (1) printing the data, (2) taking a screenshot of the data, (3) copying the data, and/or (4) pasting the data.

In one embodiment, a system for implementing the above-described method may include (1) an interception module, stored in memory, that intercepts, as part of a DLP application, user input intended for a data-processing application that would, if received by the data-processing application, cause the data-processing application to perform an operation on data that may violate a DLP policy, (2) a causation module, stored in memory, that, upon intercepting the user input, causes the data-processing application to perform an alternative operation on the data that makes the data accessible to the DLP application, (3) a scanning module, stored in memory, that scans, while the data-processing application is prevented from performing the operation, the data for compliance with the DLP policy, (4) a determination module, stored in memory, that determines, based on a result of the scanning, that the data complies with the DLP policy, and (5) a physical processor configured to execute the interception module, the causation module, the scanning module, and the determination module. In this embodiment, the causation module may also cause, in response to the determination module determining that the data complies with the DLP policy, the data-processing application to perform the operation.

In some examples, the above-described method may be encoded as computer-readable instructions on a non-transitory computer-readable medium. For example, a computer-readable medium may include one or more computer-executable instructions that, when executed by a processor of a computing device, may cause the computing device to (1) intercept, as part of a DLP application, user input intended for a data-processing application that would, if received by the data-processing application, cause the data-processing application to perform an operation on data that may violate a DLP policy, (2) upon intercepting the user input, cause the data-processing application to perform an alternative operation on the data that makes the data accessible to the DLP application, (3) scan, while the data-processing application is prevented from performing the operation, the data for compliance with the DLP policy, (4) determine, based on a result of the scanning, that the data complies with the DLP policy, and (5) cause, in response to determining that the data complies with the DLP policy, the data-processing application to perform the operation.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
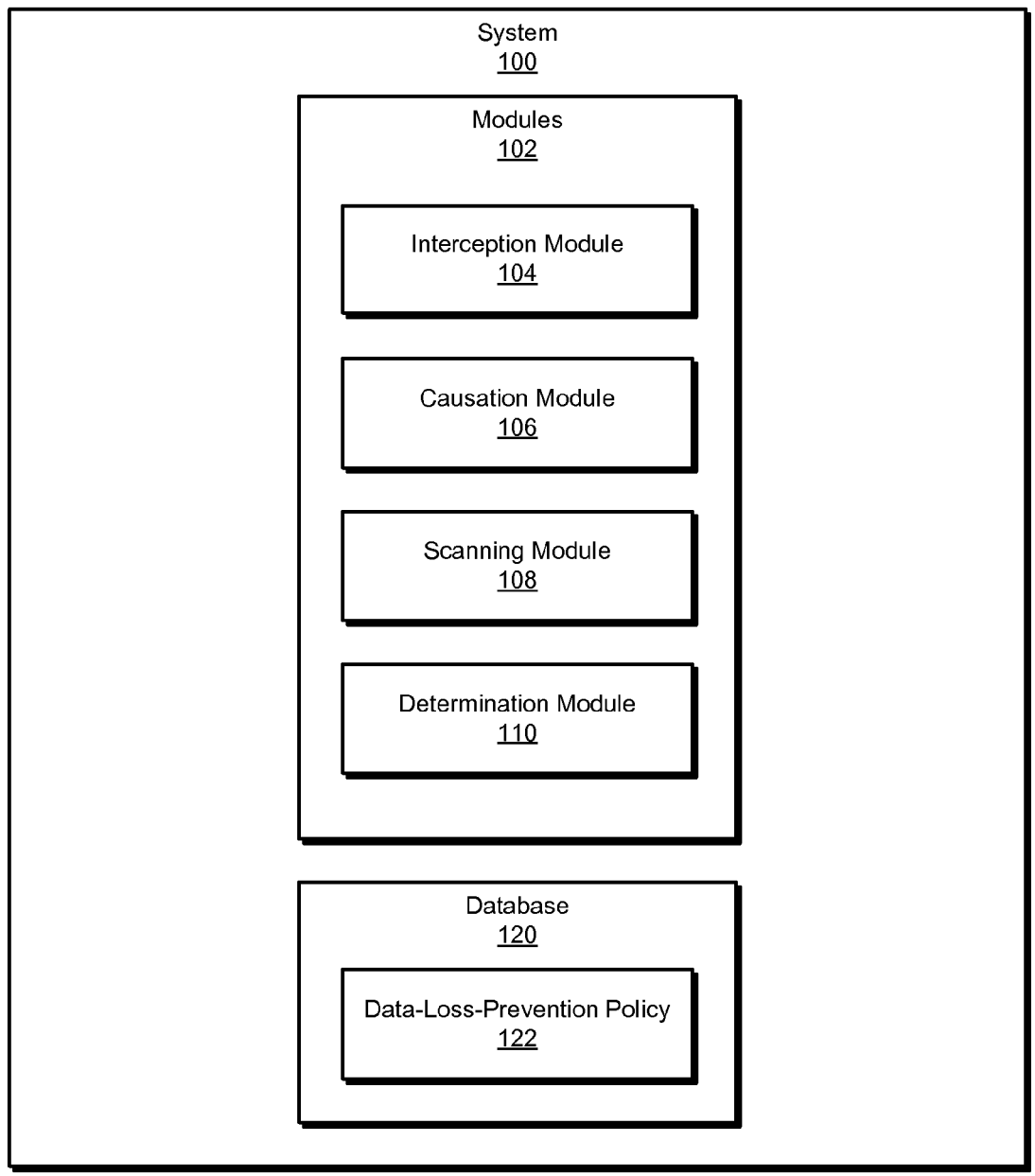
FIG. 1 is a block diagram of an exemplary system for capturing input from users to prevent data loss.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for capturing input from users to prevent data loss. As will be explained in greater detail below, by (1) capturing user input that, once received by an application, may trigger the application to disseminate certain information and (2) sending alternative user input to the application in place of the user input that makes the information available to a DLP application for scanning, the systems and methods may effectively prevent the application from disseminating potentially sensitive information. In some examples, the disclosed systems and methods may capture user input intended to trigger an email application to send an email. In these examples, the disclosed systems and methods may prevent the email application from receiving the user input and, instead, may send alternative user input to the email application that instructs the email application to save the email to a location accessible by a DLP application such that the DLP application may scan the email for compliance with a DLP policy.

The following will provide, with reference to FIGS. 1, 2, 4, and 5 detailed descriptions of exemplary systems for capturing input from users to prevent data loss. Detailed descriptions of corresponding computer-implemented methods will also be provided in connection with FIGS. 3 and 6. In addition, detailed descriptions of an exemplary computing system and network architecture capable of implementing one or more of the embodiments described herein will be provided in connection with FIGS. 7 and 8, respectively.

FIG. 1 is a block diagram of exemplary system 100 for capturing input from users to prevent data loss. As illustrated in this figure, exemplary system 100 may include one or more modules 102 for performing one or more tasks. For example, and as will be explained in greater detail below, exemplary system 100 may include an interception module 104 that may intercept user input intended for a data-processing application that would, if received by the data-processing application, cause the data-processing application to perform an operation on data that may violate a DLP policy. Exemplary system 100 may additionally include a causation module 106 that may cause, upon intercepting the user input, the data-processing application to perform an alternative operation on the data that makes the data accessible to the DLP application.

Exemplary system 100 may also include a scanning module 108 that may scan, while the data-processing application is prevented from performing the operation, the data for compliance with the DLP policy. Exemplary system 100 may additionally include a determination module 110 that may determine, based on a result of the scanning, that the data complies with the DLP policy. In some examples, causation module 106 may further cause, in response to determining that the data complies with the DLP policy, the data-processing application to perform the operation. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store one or more DLP policies, such as DLP policy 122. Database 120 may represent portions of a single database or computing device or a plurality of databases or computing devices. For example, database 120 may represent a portion of computing device 202 in FIG. 2, computing system 710 in FIG. 7, and/or portions of exemplary network architecture 800 in FIG. 8. Alternatively, database 120 in FIG. 1 may represent one or more physically separate devices capable of being accessed by a computing device, such as server 206 in FIG. 2, computing system 710 in FIG. 7, and/or portions of exemplary network architecture 800 in FIG. 8.

Figure 2:
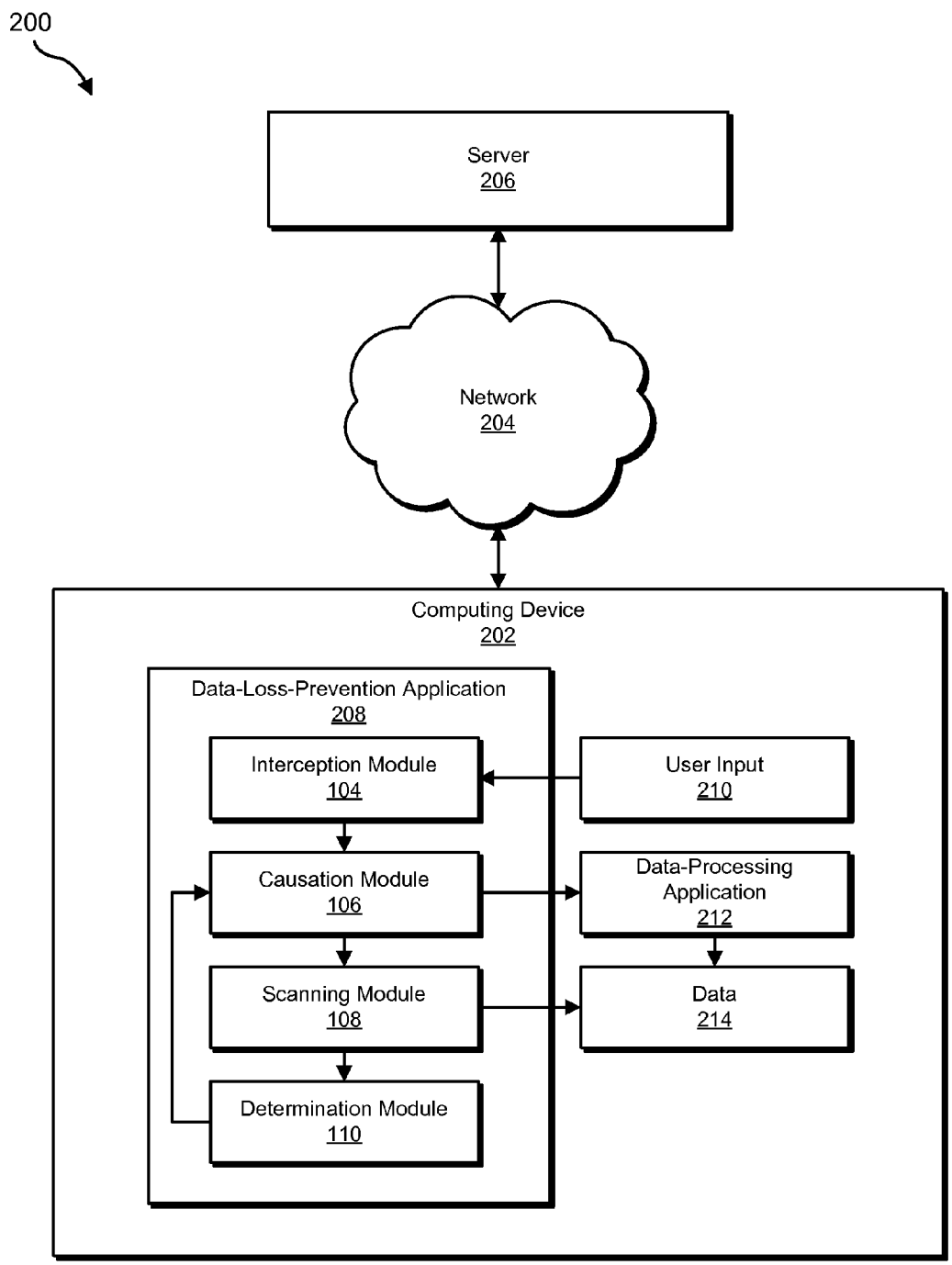
FIG. 2 is a block diagram of an additional exemplary system for capturing input from users to prevent data loss.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in database 120. Additionally or alternatively, server 206 may be programmed with one or more of modules 102 and/or may store all or a portion of the data in database 120.

In one embodiment, one or more of modules 102 from FIG. 1 may, when executed by a processor of computing device 202 and/or server 206, enable computing device 202 and/or server 206 to capture input from users to prevent data loss. For example, and as will be described in greater detail below, interception module 104 may intercept, as part of a DLP application 208, user input 210 intended for a data-processing application 212 that would, if received by data-processing application 212, cause data-processing application 212 to perform an operation on data 214 that may violate a DLP policy 122. Causation module 106 may then cause data-processing application 212 to perform an alternative operation on data 214 that makes data 214 accessible to DLP application 208. Scanning module 108 may then scan, while data-processing application 212 is prevented from performing the operation, data 214 for compliance with DLP policy 122. Determination module 110 may then determine, based on a result of the scanning, that data 214 complies with DLP policy 122. Causation module 106 may then cause, in response to the determination that data 214 complies with DLP policy 122, data-processing application 212 to perform the operation.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 710 in FIG. 7, or any other suitable computing device.

Server 206 generally represents any type or form of computing device that is capable of reading computer-executable instructions. Examples of server 206 include, without limitation, application servers and database servers configured to provide various database services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 800 in FIG. 8, or the like. Network 204 may facilitate communication or data transfer using wireless or wired connections. In one embodiment, network 204 may facilitate communication between computing device 202 and server 206.

Figure 3:
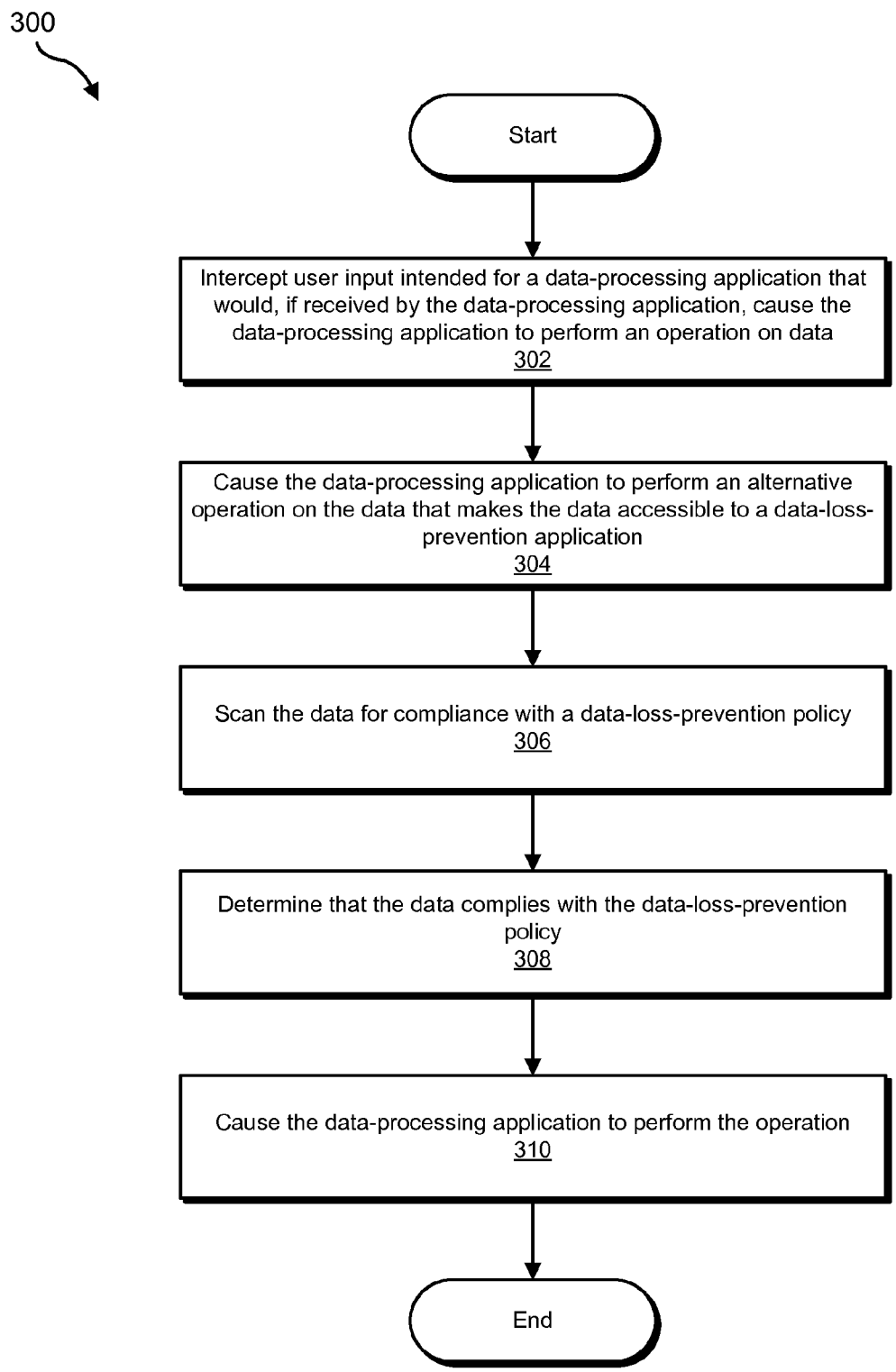
FIG. 3 is a flow diagram of an exemplary method for capturing input from users to prevent data loss.

FIG. 3 is a flow diagram of an exemplary computer-implemented method 300 for capturing input from users to prevent data loss. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, system 400 in FIG. 4, system 500 in FIG. 5, computing system 710 in FIG. 7, and/or portions of exemplary network architecture 800 in FIG. 8.

As illustrated in FIG. 3, at step 302, one or more of the systems described herein may intercept, as part of a DLP application, user input intended for a data-processing application that would, if received by the data-processing application, cause the data-processing application to perform an operation on data that may violate a DLP policy. For example, interception module 104 may, as part of DLP application 208 running on computing device 202 in FIG. 2, intercept user input 210 intended for data-processing application 212 that would, if received by data-processing application 212, cause data-processing application 212 to perform an operation on data 214 that may violate DLP policy 122.

Interception module 104 may intercept user input intended for a data-processing application as part of a DLP application. As used herein, the term "data-loss-prevention application" generally refers to any application that guards against the unauthorized distribution of sensitive information. In some examples, a DLP application may monitor a data-processing application to detect and prevent activities that may breach a DLP policy. In some examples, the DLP application may function as a filter that only allows the data-processing application to disseminate content that satisfies the criteria set forth in the DLP policy.

In some examples, the systems and methods disclosed herein may, as part of a DLP application, indirectly monitor a data-processing application to detect and prevent activities that may breach a DLP policy. For example, the systems and methods disclosed herein may, as part of a DLP application, monitor a data-processing application by monitoring user inputs intended for the data-processing application before the user inputs are received by the data-processing application. In some examples, the DLP application may operate as part of a DLP service provided by a security-service provider. Additionally or alternatively, the DLP application may operate as part of antivirus software.

In some examples, a DLP application may be separate and distinct from the applications that the DLP application is intended to monitor. For example, the DLP application described herein may differ from traditional DLP solutions that are integrated directly into the applications which the DLP solutions are intended to monitor. By utilizing a DLP application that is separate and distinct from the application that the DLP application is intended to monitor, the disclosed systems and methods may effectively monitor applications that do not allow for the integration of DLP applications. For example, the disclosed systems and methods may utilize the DLP application to effectively monitor applications that do not allow for DLP add-ins.

As used herein, the term "data-loss-prevention policy" generally refers to any policy directed at preventing the unauthorized distribution of sensitive information. Examples of sensitive information may include, without limitation, confidential business information, financial information, intellectual-property information, patient information, credit-card information, and/or any other information and/or class of information determined to be sensitive by the disclosed systems and methods. In some examples, a DLP policy may specify specific information that may not be distributed. For example, a DLP policy may specify a particular document and/or certain language that may not be distributed. Additionally or alternatively, a DLP policy may specify a type of information that may not be distributed. For example, a DLP policy may specify that confidential business information may not be distributed.

In some examples, a DLP policy may specify parties that are authorized and/or unauthorized to distribute a specified content and/or type of content. For example, a DLP policy may specify that management personnel are authorized to distribute confidential business information but that non-management personnel are not authorized to distribute confidential business information. Additionally or alternatively, a DLP policy may further specify locations to which the specified content and/or type of content may or may not be distributed. For example, a DLP policy may specify that a particular document may be distributed to company email addresses but may not be distributed to non-company email addresses.

Interception module 104 may intercept user input intended for a variety of data-processing applications. As used herein, the term "data-processing application" may refer to any application that a user may use to create, access, disseminate, and/or otherwise process data and/or any application that performs operations on data that may violate a DLP policy. For example, a data-processing application may refer to an application capable of disseminating potentially confidential information. Examples of data-processing applications may include, without limitation, email applications, screen-capturing applications, and/or word-processor applications.

Figure 4:
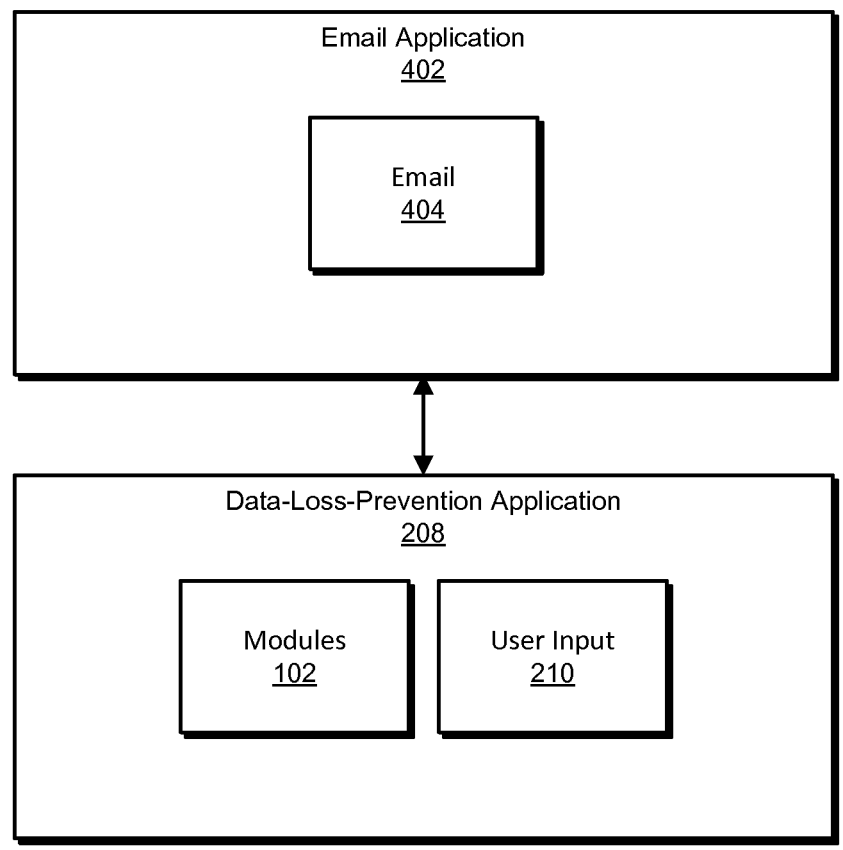
FIG. 4 is a block diagram of an exemplary computing system for capturing input from users to prevent data loss in an email context.

Interception module 104 may intercept user input that may cause a data-processing application to perform various kinds of operations on data that may violate a DLP policy. The term "operation," as used herein, generally refers to any task that may be executed by a computer. Examples of operations that may potentially violate a DLP policy include, without limitation, emailing data, printing data, taking a screenshot of data, copying data, saving data, and/or pasting data. In some examples, interception module 104 may intercept user input directed at sending an email. For example, data-processing application 212 may represent an email application that operates as part of an email platform, such as APPLE MAIL, OUTLOOK, GMAIL, YAHOO, etc., and data 214 may represent an email that a user of the email application is attempting to send via the email application. In these examples, interception module 104 may intercept input from the user of the email application that would, if received by the email application, cause the email application to send the email to a location designated by the user. For example, as illustrated in FIG. 4, interception module 104 may, as part of DLP application 208, intercept input from a user of an email application 402 that would, if received by email application 402, cause email application 402 to send an email 404.

In some examples, a data-processing application may be configured to perform operations that may violate a DLP policy in response to receiving user input from a user of the data-processing application. As used herein, the term "user input" generally refers to any input received from a user through an input device, such as a keyboard or a mouse. Examples of user input include, without limitation, a mouse event, such as a mouse click, and/or a keyboard event, such as a command from a keyboard.

Interception module 104 may intercept various kinds of user input that may cause a data-processing application to perform an operation on data that may violate a DLP policy. For example, interception module 104 may intercept a mouse or a keyboard event intended for data-processing application 212 that would, if received by data-processing application 212, cause data-processing application 212 to perform an operation on data 214. Using FIG. 4 as an example, interception module 104 may intercept a mouse click corresponding to a send button displayed within email application 402. In this example, a user may have submitted the mouse click, and the mouse click may, if received by email application 402, trigger email application 402 to send email 404. Using FIG. 4 as another example, interception module 104 may intercept a keyboard command, such as "cmd+return." In this example, a user may have submitted the command "cmd+return," and the command may, if received by email application 402, trigger email application 402 to send email 404.

In some examples, interception module 104 may intercept a user input by utilizing a component of an operating system (e.g., APPLE's QUARTZ EVENT SERVICES) that allows user-input events destined for data-processing applications to be monitored and filtered. Using FIG. 5 as an example, interception module 104 may receive information relating to user input 210 from an operating system component 502 of computing device 202. In some examples, operating system component 502 may be configured to (1) identify inputs from users, (2) determine to which applications the users are intending to submit the inputs, and (3) relay the inputs to the appropriate applications. In some examples, interception module 104 may register with operating system component 502 to receive the user inputs intended for a data-processing application before or instead of the data-processing application.

In some examples, interception module 104 may interface with an application accessibility application programming interface (API) (e.g., APPLE's OS X Accessibility API) to determine what operation a received user input (e.g., a mouse click) would trigger if received by a data-processing application. Using FIG. 5 as an example, interception module 104 may interface with an application accessibility API 504 to determine what operation user input 210 would trigger if received by data-processing application 212.

In some examples, interception module 104 may, as part of intercepting user input, temporarily prevent a data-processing application from receiving the user input. In one example, by temporarily preventing a data-processing application from receiving a user input, interception module 104 may prevent the data-processing application from performing an operation that the user input would have otherwise triggered and that may violate a DLP policy. As will be explained below, the systems and methods disclosed herein may later allow the data-processing application to perform the operation on the data after it is determined that the operation will not violate a DLP policy. Using FIG. 4 as an example, interception module 104 may prevent email application 402 from receiving user input 210, thereby temporarily preventing email application 402 from sending email 404.

In some examples, interception module 104 may intercept user input in response to determining that a data-processing application does not support certain add-ins. Using FIG. 4 as an example, interception module 104 may intercept user input 210 in response to determining that email application 402 does not support add-ins capable of capturing outgoing email data. In another example, interception module 104 may intercept user input in response to determining that email application 402 does not support add-ins capable of preventing send operations.

Returning to FIG. 3, at step 304, one or more of the systems described herein may cause, upon intercepting the user input, the data-processing application to perform an alternative operation on the data that makes the data accessible to the DLP application. For example, causation module 106 may, as part of computing device 202 in FIG. 2 cause data-processing application 212 to perform an alternative operation on data 214 that makes data 214 accessible to DLP application 208.

As used herein, the term "alternative operation" may refer to any computer-executed task that a data-processing application may perform that will make data from the data-processing application available to a DLP application for DLP processing. Examples of alternative operations include, without limitation, save and/or send operations. For example, an email application may perform an alternative operation on an email by saving the email to a location accessible to a DLP application and/or by sending (e.g., via an inter-process communication channel) the email to the DLP application.

Causation module 106 may cause a data-processing application to perform an alternative operation in a variety of ways. In some examples, causation module 106 may cause a data-processing application to perform an alternative operation by (1) generating an alternative user input that will, when received by the data-processing application, cause the data-processing application to perform the alternative operation and (2) sending the alternative user input to the data-processing application. Using FIG. 4 as an example, user input 210 may represent user input that would, if received by email application 402, cause email application 402 to send email 404, as discussed above. In this example, causation module 106 may generate an alternative user input that will, when received by email application 402, cause email application 402 to save email 404 to a location accessible to DLP application 208. Causation module 106 may then send the alternative user input to email application 402 instead of sending user input 210 to email application 402, thereby causing email application 402 to save email 404 instead of sending email 404. In some examples, causation module 106 may send the alternative user input to email application 402 by sending a mouse or a keyboard event that is associated with a save command of email application 402. For example, causation module 106 may send the command "cmd+s" to email application 402 to cause email application 402 to save email 404.

Returning to FIG. 3, at step 306, one or more of the systems described herein may, while the data-processing application is prevented from performing the operation, scan the data for compliance with the DLP policy. For example, scanning module 108 may, as part of computing device 202 in FIG. 2, scan data 214 for compliance with DLP policy 122 while data-processing application 212 is prevented from performing the operation associated with user input 210.

Scanning module 108 may scan data in a variety of ways. In general, scanning module 108 may scan data for compliance with a DLP policy after causation module 106 has caused a data-processing application to perform an alternative operation on the data by (1) accessing the data and (2) analyzing the data and/or a pending operation that may be performed on the data for violations of the DLP policy. In instances where the alternative operation includes saving the data to a location accessible to a DLP application, scanning module 108 may read, as part of the DLP application, the saved data from the location. In some examples, scanning module 108 may access the data by receiving the data from a data-processing application via an inter-application communication channel. In at least one example, causation module 106 may utilize a scripting language (e.g., APPLE's APPLESCRIPT) to access the data.

Figure 5:
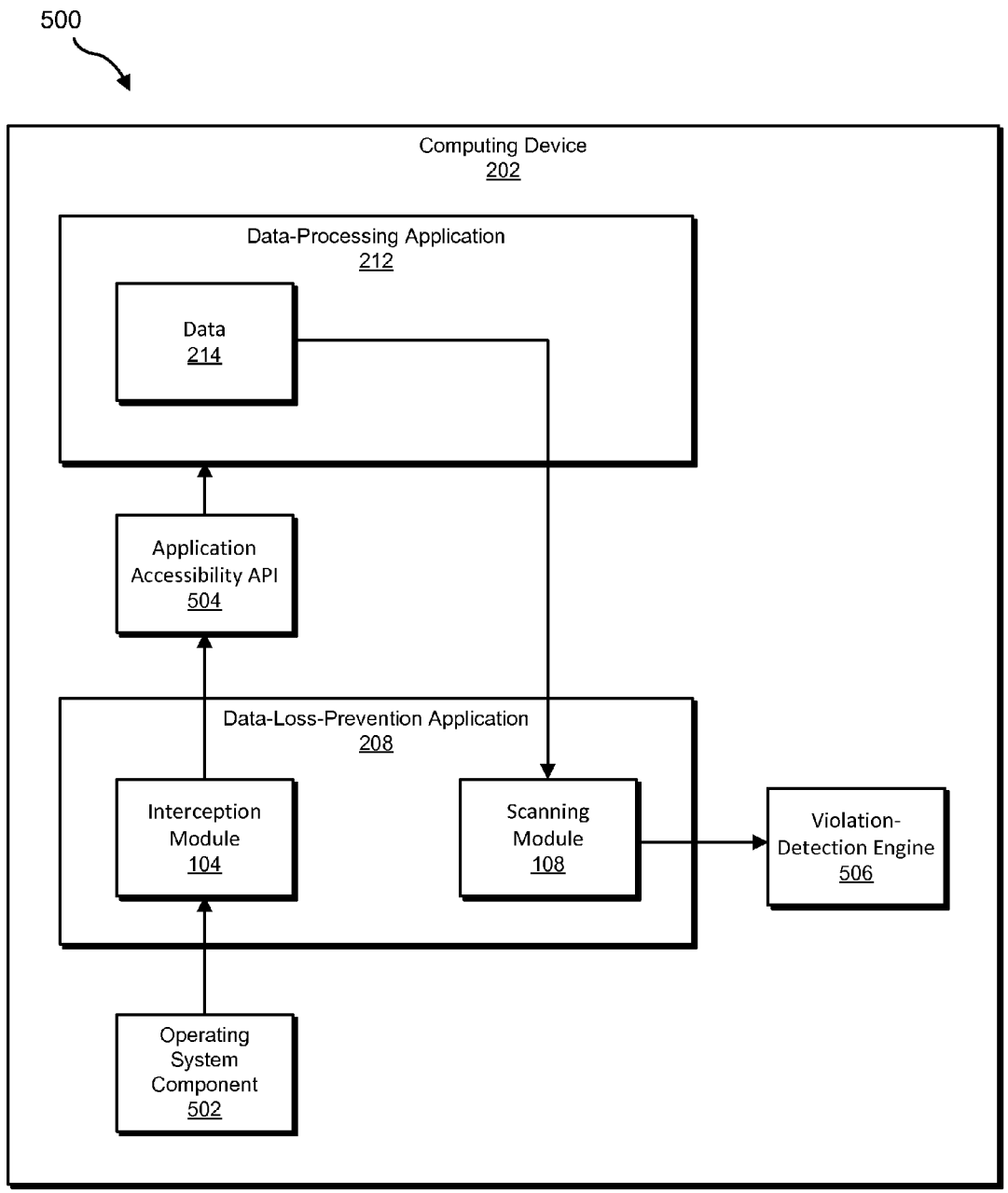
FIG. 5 is a block diagram of an additional exemplary computing system for capturing input from users to prevent data loss.

In some examples, scanning module 108 may analyze data and/or a pending operation that may be performed on the data for violations of a DLP policy. Additionally or alternatively, scanning module 108 may send the data to a remote service for DLP processing. For example, as shown in FIG. 5, scanning module 108 may send data 214 to a violation-detection engine 506. In this example, violation-detection engine 506 may scan data 214 for violations of a DLP policy.

At step 308, one or more of the systems described herein may determine, based on a result of the scanning performed at step 306, that the data complies with the DLP policy. For example, determination module 110 may, as part of computing device 202 in FIG. 2, determine that data 214 complies with DLP policy 122.

Determination module 110 may determine that data complies with a DLP policy in a variety of ways. For example, determination module 110 may determine that data 214 complies with DLP policy 122 based on a result of the scanning performed at step 306. For example, if scanning module 108 scanned data 214 for specific words and/or phrases that DLP policy 122 designates as sensitive, determination module 110 may determine that data 214 complies with DLP policy 122 if data 214 does not include the specific words and/or phrases. Additionally or alternatively, if scanning module 108 scanned data 214 for information that identifies an intended location to which data 214 is to be disseminated, determination module 110 may determine that data 214 complies with DLP policy 122 if DLP policy 122 does not designate the identified intended location as unauthorized and/or if DLP policy 122 designates the identified intended location as authorized. Additionally or alternatively, if scanning module 108 scanned data 214 for information that identifies an intended recipient to whom data 214 is to be disseminated, determination module 110 may determine that data 214 complies with DLP policy 122 if DLP policy 122 does not designate the identified intended recipient as unauthorized and/or if DLP policy 122 designates the identified intended recipient as authorized.

At step 310, one or more of the systems described herein may cause, in response to determining that the data complies with the DLP policy, the data-processing application to perform the operation associated with the user input intercepted as part of step 302. For example, causation module 106 may, as part of computing device 202 in FIG. 2, cause data-processing application 212 to perform the operation associated with user input 210 in response to determination module 110 determining that the operation and/or data 214 complies with DLP policy 122.

Causation module 106 may perform step 310 in a variety of ways. In some examples, causation module 106 may cause a data-processing application to perform the operation associated with the user input intercepted at step 302 by sending the same or similar substitute user input to the data-processing application. For example, if an email application is configured to send an email in response to receiving the keyboard command "cmd+return" and the user input intercepted at step 302 was the command "cmd+return," causation module 106 may cause the email application to send the email in the manner originally requested by a user by sending the command "cmd+return" to the email application. Additionally or alternative, causation module 106 may cause a data-processing application to perform the operation associated with the user input intercepted at step 302 by instructing the data-processing application to perform the operation via an API of the data-processing application. Upon completion of step 310 in FIG. 3, exemplary method 300 may terminate.

Figure 6:
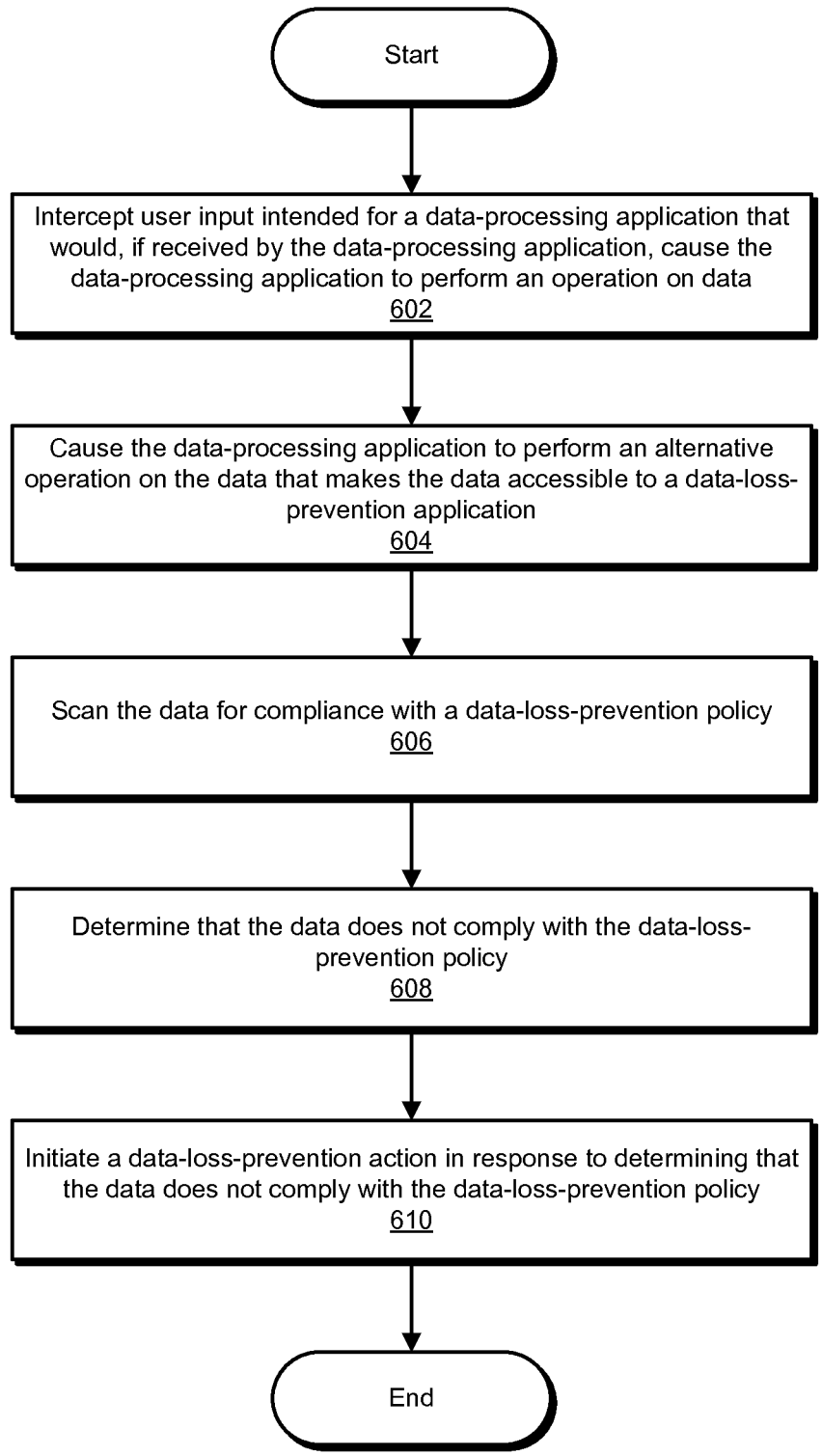
FIG. 6 is an additional flow diagram of an exemplary method for capturing input from users to prevent data loss.

While FIG. 3 represents examples of a system and/or method in which data complies with a DLP policy, FIG. 6 represents examples of a system and/or method in which data does not comply with a DLP policy. FIG. 6 is an additional flow diagram of an exemplary computer-implemented method 600 for capturing input from users to prevent data loss. The steps shown in FIG. 6 may be performed by any suitable computer-executable code and/or computing system. In some embodiments, the steps shown in FIG. 6 may be performed by one or more of the components of system 100 in FIG. 1, system 200 in FIG. 2, system 400 in FIG. 4, system 500 in FIG. 5, computing system 710 in FIG. 7, and/or portions of exemplary network architecture 800 in FIG. 8.

As illustrated in FIG. 6, at step 602, one or more of the systems described herein may intercept, as part of a DLP application, user input intended for a data-processing application that would, if received by the data-processing application, cause the data-processing application to perform an operation on data that may violate a DLP policy. For example, interception module 104 may, as part of DLP application 208 running on computing device 202 in FIG. 2, intercept user input 210 intended for data-processing application 212 that would, if received by data-processing application 212, cause data-processing application 212 to perform an operation on data 214 that may violate DLP policy 122. Step 602 is similar to step 302 in FIG. 3, therefore, the discussion of step 302 may also apply to step 602.

At step 604, one or more of the systems described herein may cause, upon intercepting the user input, the data-processing application to perform an alternative operation on the data that makes the data accessible to the DLP application. For example, causation module 106 may, as part of computing device 202 in FIG. 2, cause data-processing application 212 to perform an alternative operation on data 214 that makes data 214 accessible to DLP application 208. Step 604 is similar to step 304 in FIG. 3, therefore, the discussion of step 304 may also apply to step 604.

At step 606, one or more of the systems described herein may, while the data-processing application is prevented from performing the operation, scan the data for compliance with the DLP policy. For example, scanning module 108 may, as part of computing device 202 in FIG. 2, scan data 214 for compliance with DLP policy 122 while data-processing application 212 is prevented from performing the operation. Step 606 is similar to step 306 in FIG. 3, therefore, the discussion of step 306 may also apply to step 606.

At step 608, one or more of the systems described herein may determine, based on a result of the scanning performed at step 306, that the data does not comply with the DLP policy. For example, determination module 110 may, as part of computing device 202 in FIG. 2, determine that data 214 does not comply with DLP policy 122.

Determination module 110 may determine that data does not comply with a DLP policy in a variety of ways. In some examples, determination module 110 may determine that data does not comply with a DLP policy if the data includes certain content. For example, determination module 110 may determine that the data does not comply with the DLP policy if the data includes specific words and/or phrases designated as sensitive in the DLP policy. Additionally or alternatively, determination module 110 may determine that the data does not comply with the DLP policy if the DLP policy designates an intended location indicated in the data as unauthorized. Additionally or alternatively, determination module 110 may determine that the data does not comply with the DLP policy if the DLP policy designates an intended recipient indicated in the data as unauthorized.

At step 610, one or more of the systems described herein may initiate, in response to determining that the data does not comply with the DLP policy, a DLP action. For example, causation module 106 may, as part of computing device 202 in FIG. 2, initiate a DLP action in response to determination module 110 determining that data 214 does not comply with DLP policy 122.

Causation module 106 may initiate a variety of DLP actions if data does not comply with a DLP policy. For example, causation module 106 may inform a user of data-processing application 212 that data 214 does not comply with DLP policy 122. In one example, causation module 106 may inform the user that the operation will not be performed on data 214. As another example, causation module 106 may inform an administrator of data-processing application 212 that a user has attempted to perform an operation on data 214 that does not comply with DLP policy 122. In one embodiment, causation module 106 may permanently block data-processing application 212 from performing the operation on data 214. Upon completion of step 610 in FIG. 6, exemplary method 600 may terminate.

As discussed above, the disclosed systems and methods may capture user input intended for an application that may, if received by the application, trigger the application to disseminate certain information. By capturing the user input, the disclosed systems and methods may prevent the application from receiving the user input, thereby preventing the intended dissemination. In some examples, the disclosed systems and methods may send alternative input to the application that causes the application to perform an action that makes the information available to the disclosed systems and methods for DLP processing. After capturing the user input, the disclosed systems and methods may analyze the information to determine whether the information includes sensitive data. In some examples, the disclosed systems and methods may cause the application to disseminate the information after determining that the information does not include sensitive data. In additional or alternative examples, the disclosed systems and methods may permanently prevent the application from disseminating the information after determining that the information includes sensitive information. By controlling whether applications receive user input that may trigger information dissemination, the disclosed systems and methods may indirectly control which information is disseminated from the applications.

Figure 7:
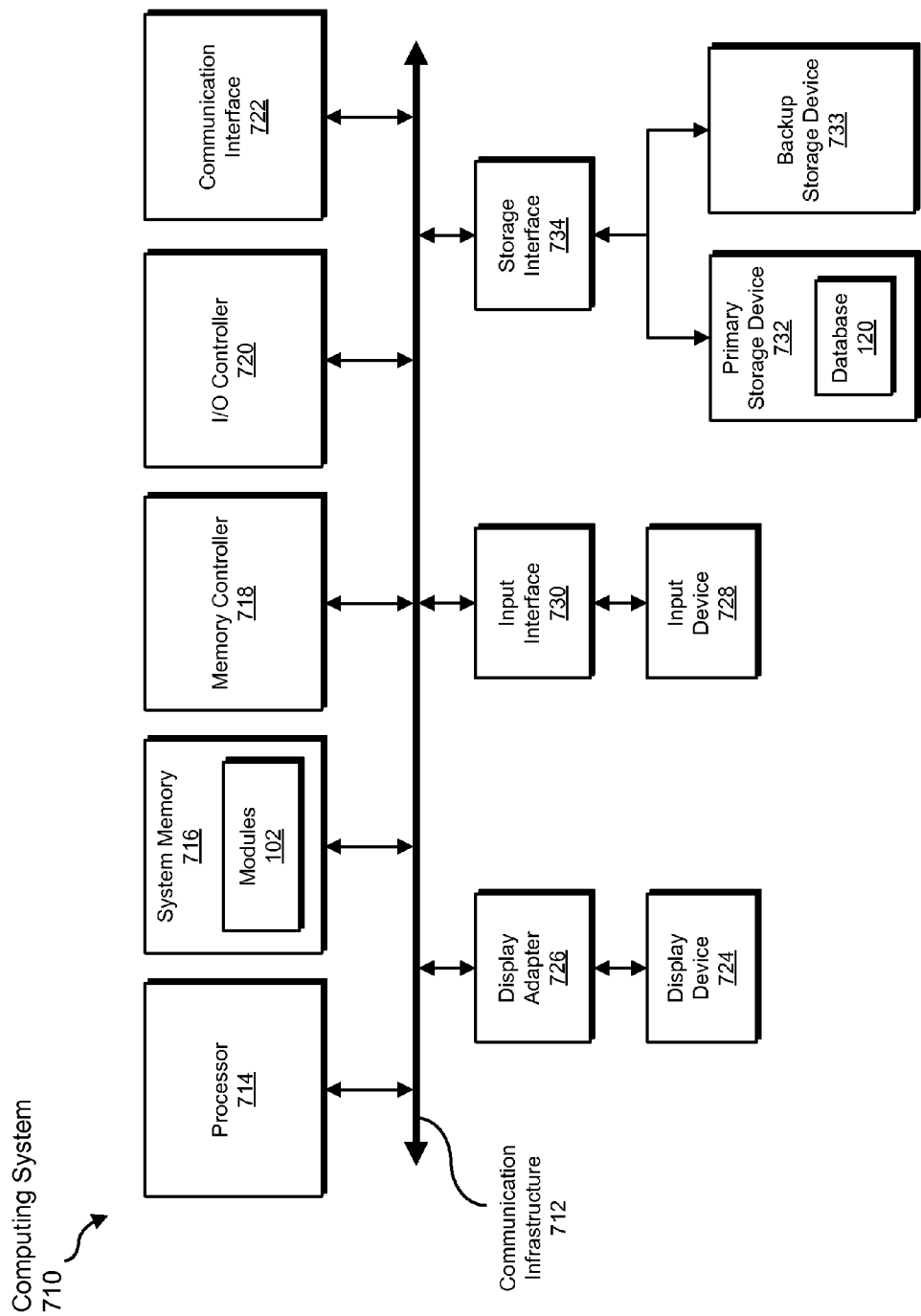
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. For example, all or a portion of computing system 710 may perform and/or be a means for performing, either alone or in combination with other elements, one or more of the steps described herein (such as one or more of the steps illustrated in FIG. 3). All or a portion of computing system 710 may also perform and/or be a means for performing any other steps, methods, or processes described and/or illustrated herein.

Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include a processor 714 and a system memory 716.

Processor 714 generally represents any type or form of physical processing unit (e.g., a hardware-implemented central processing unit) capable of processing data or interpreting and executing instructions. In certain embodiments, processor 714 may receive instructions from a software application or module. These instructions may cause processor 714 to perform the functions of one or more of the exemplary embodiments described and/or illustrated herein.

System memory 716 generally represents any type or form of volatile or non-volatile storage device or medium capable of storing data and/or other computer-readable instructions. Examples of system memory 716 include, without limitation, Random Access Memory (RAM), Read Only Memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an Industry Standard Architecture (ISA), Peripheral Component Interconnect (PCI), PCI Express (PCIe), or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a solid state drive, a floppy disk drive, a magnetic tape drive, an optical disk drive, a flash drive, or the like. Storage interface 734 generally represents any type or form of interface or device for transferring data between storage devices 732 and 733 and other components of computing system 710. In one example, database 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an Application Specific Integrated Circuit (ASIC) adapted to implement one or more of the exemplary embodiments disclosed herein.

Figure 8:
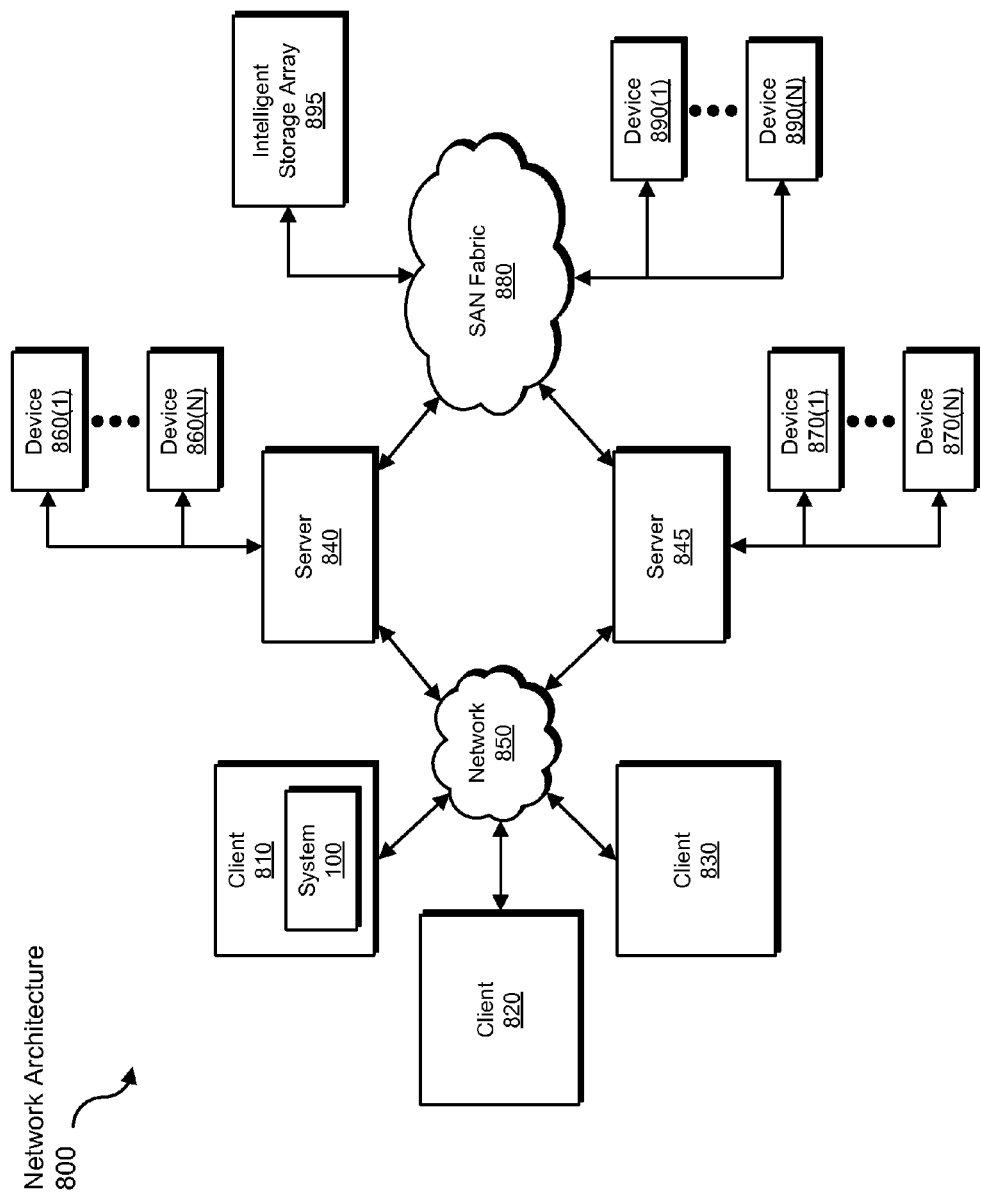
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. As detailed above, all or a portion of network architecture 800 may perform and/or be a means for performing, either alone or in combination with other elements, one or more of the steps disclosed herein (such as one or more of the steps illustrated in FIG. 3). All or a portion of network architecture 800 may also be used to perform and/or be a means for performing other steps and features set forth in the instant disclosure.

Client systems 810, 820, and 830 generally represent any type or form of computing device or system, such as exemplary computing system 710 in FIG. 7. Similarly, servers 840 and 845 generally represent computing devices or systems, such as application servers or database servers, configured to provide various database services and/or run certain software applications. Network 850 generally represents any telecommunication or computer network including, for example, an intranet, a WAN, a LAN, a PAN, or the Internet. In one example, client systems 810, 820, and/or 830 and/or servers 840 and/or 845 may include all or a portion of system 100 from FIG. 1.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent Network-Attached Storage (NAS) devices configured to communicate with servers 840 and 845 using various protocols, such as Network File System (NFS), Server Message Block (SMB), or Common Internet File System (CIFS).

Servers 840 and 845 may also be connected to a Storage Area Network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850.

As detailed above, computing system 710 and/or one or more components of network architecture 800 may perform and/or be a means for performing, either alone or in combination with other elements, one or more steps of an exemplary method for capturing input from users to prevent data loss.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive user input destined to a data-processing application for the purpose of causing the data-processing application to perform an operation on data, transform the received user input into additional user input that, if sent to the data-processing application, will cause the data-processing application to store the data in a way that makes the data accessible to a DLP application for scanning, output a result of the transformation to the data-processing application, and use the result of the transformation to cause the data-processing application to store the data in the way that makes the data accessible to the DLP application. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for capturing input from users to prevent data loss, at least a portion of the method being performed by a computing system comprising at least one computer processor, the method comprising:
    intercepting, as part of a data-loss-prevention application, user input intended for an email application that would, if received by the email application, cause the email application to send an email to a location designated by a user of the email application, wherein:
        sending the email to the location designated by the user may violate a data-loss-prevention policy;
        the data-loss-prevention application is separate and distinct from the email application;
    upon intercepting the user input, sending a command to the email application to save the email to a location accessible to the data-loss-prevention application, wherein sending the command comprises sending at least one of a mouse or keyboard event that is associated with a save command of the email application;
    scanning, while the email application is prevented from sending the email to the location designated by the user, the email for compliance with the data-loss-prevention policy;
    determining, based on a result of the scanning, that the email complies with the data-loss-prevention policy; and
    sending, in response to determining that the email complies with the data-loss-prevention policy, an additional command to the email application to send the email to the location designated by the user.

2. The computer-implemented method of claim 1, wherein intercepting the user input intended for the email application comprises intercepting, as part of the data-loss-prevention application, a keyboard event intended for the email application that would, if received by the email application, cause the email application to send the email to the location designated by the user.

3. The computer-implemented method of claim 2, wherein the keyboard event intended for the email application comprises the command cmd+return.

4. The computer-implemented method of claim 3, wherein sending the additional command to the email application to send the email to the location designated by the user comprises sending the command cmd+return to the email application.

5. The computer-implemented method of claim 1, wherein intercepting the user input comprises temporarily preventing the email application from sending the email to the location designated by the user.

6. The computer-implemented method of claim 1, wherein intercepting the user input comprises intercepting the user input in response to determining that the email application does not support add-ins capable of performing at least one of capturing outgoing email data or preventing send operations.

7. The computer-implemented method of claim 1, wherein intercepting the user input intended for the email application comprises intercepting, as part of the data-loss-prevention application, a mouse event intended for the email application that would, if received by the email application, cause the email application to send the email to the location designated by the user.

8. The computer-implemented method of claim 1, wherein sending the additional command to the email application to send the email to the location designated by the user comprises instructing the email application via an application programming interface of the email application.

9. The computer-implemented method of claim 1, further comprising:
    intercepting, as part of the data-loss-prevention application, additional user input intended for the email application that would, if received by the email application, cause the email application to send an additional email to an additional location designated by the user;
    upon intercepting the additional user input, sending the command to the email application to save the additional email to the location accessible to the data-loss-prevention application;
    scanning, while the email application is prevented from sending the additional email to the additional location, the additional email for compliance with the data-loss-prevention policy;
    determining, based on a result of the scanning, that the additional email does not comply with at least one element of the data-loss-prevention policy; and initiating a data-loss-prevention action in response to determining that the additional email does not comply with the element of the data-loss-prevention policy.

10. The computer-implemented method of claim 9, wherein the data-loss-prevention action comprises at least one of:
- informing a user of the email application that the additional email does not comply with the element of the data-loss-prevention policy;
- informing the user that the email will not be sent;
- informing an administrator of the email application that the user has attempted to send the additional email and that the additional email that does not comply with the element of the data-loss-prevention policy; and
- permanently blocking the email application from sending the additional email to the additional location.

11. The computer-implemented method of claim 9, wherein determining that the additional email does not comply with the element of the data-loss-prevention policy comprises determining that the email includes at least one of words or phrases designated as sensitive in the data-loss-prevention policy.

12. The computer-implemented method of claim 9, wherein determining that the additional email does not comply with the element of the data-loss-prevention policy comprises determining that at least one of the additional location designated by the user is unauthorized or an intended recipient of the email is unauthorized.

13. A system for capturing input from users to prevent data loss, the system comprising:
- an interception module, stored in memory, that intercepts, as part of a data-loss-prevention application, user input intended for an email application that would, if received by the email application, cause the email application to send an email to a location designated by a user of the email application, wherein:
  - sending the email to the location designated by the user may violate a data-loss-prevention policy;
  - the data-loss-prevention application is separate and distinct from the email application;
- a causation module, stored in memory, that, upon the interception module intercepting the user input, sends a command to the email application to save the email to a location accessible to the data-loss-prevention application, wherein the causation module sends the command by sending at least one of a mouse or keyboard event that is associated with a save command of the email application;
- a scanning module, stored in memory, that scans, while the email application is prevented from sending the email to the location designated by the user, the email for compliance with the data-loss-prevention policy;
- a determination module, stored in memory, that determines, based on a result of the scanning, that the email complies with the data-loss-prevention policy;
- wherein the causation module sends, in response to the determination module determining that the email complies with the data-loss-prevention policy, an additional command to the email application to send the email to the location designated by the user; and
- at least one physical processor configured to execute the interception module, the causation module, the scanning module, and the determination module.

14. The system of claim 13, wherein the interception module intercepts the user input intended for the email application by intercepting, as part of the data-loss-prevention application, a keyboard event intended for the email application that would, if received by the email application, cause the email application to send the email to the location designated by the user.

15. The system of claim 14, wherein the keyboard event intended for the email application comprises the command cmd+return.

16. The system of claim 13, wherein the interception module intercepts the user input by intercepting the user input in response to determining that the email application does not support add-ins capable of performing at least one of capturing outgoing email data or preventing send operations.

17. The system of claim 13, wherein the interception module intercepts the user input by temporarily preventing the email application from sending the email to the location designated by the user.

18. The system of claim 13, wherein the causation module sends the additional command to the email application to send the email to the location designated by the user by instructing the email application via an application programming interface.

19. The system of claim 13, wherein the interception module intercepts the user input intended for the email application by intercepting, as part of the data-loss-prevention application, a mouse event intended for the email application that would, if received by the email application, cause the email application to send the email to the location designated by the user.

20. A non-transitory computer-readable medium comprising one or more computer-readable instructions that, when executed by at least one processor of a computing device, cause the computing device to:
- intercept, as part of a data-loss-prevention application, user input intended for an email application that would, if received by the email application, cause the email application to send an email to a location designated by a user of the email application, wherein:
  - sending the email to the location designated by the user may violate a data-loss-prevention policy;
  - the data-loss-prevention application is separate and distinct from the email application;
- upon intercepting the user input, send a command to the email application to save the email to a location accessible to the data-loss-prevention application, wherein sending the command comprises sending at least one of a mouse or keyboard event that is associated with a save command of the email application;
- scan, while the email application is prevented from sending the email to the location designated by the user, the email for compliance with the data-loss-prevention policy;
- determine, based on a result of the scanning, that the email complies with the data-loss-prevention policy; and
- send, in response to determining that the email complies with the data-loss-prevention policy, an additional command to the email application to send the email to the location designated by the user.

* * * * *